US010887015B2

(12) United States Patent
Middleton et al.

(10) Patent No.: US 10,887,015 B2
(45) Date of Patent: Jan. 5, 2021

(54) RF SYSTEM WITH STIMULATED BRILLOUIN SCATTERING (SBS) PHOTONIC EQUALIZER AND RELATED METHODS

(71) Applicant: EAGLE TECHNOLOGY, LLC, Melbourne, FL (US)

(72) Inventors: Charles F. Middleton, Rockledge, FL (US); Anthony C. Klee, Melbourne, FL (US); Elliott J. Grafer, Melbourne Beach, FL (US); John Richard Desalvo, Satellite Beach, FL (US); Alexander D. Cramer, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 340 days.

(21) Appl. No.: 15/958,397

(22) Filed: Apr. 20, 2018

(65) Prior Publication Data

US 2019/0326990 A1    Oct. 24, 2019

(51) Int. Cl.
*H04B 10/2537* (2013.01)
*H04B 10/548* (2013.01)
*H04B 10/69* (2013.01)
*G02F 1/01* (2006.01)
*H01S 3/30* (2006.01)
*H04B 10/588* (2013.01)
*H04B 10/50* (2013.01)

(52) U.S. Cl.
CPC ....... *H04B 10/2537* (2013.01); *G02F 1/0123* (2013.01); *H01S 3/302* (2013.01); *H04B 10/50595* (2013.01); *H04B 10/548* (2013.01); *H04B 10/588* (2013.01); *H04B 10/6971* (2013.01); *H04B 2210/006* (2013.01)

(58) Field of Classification Search
CPC .............. H04B 10/588; H04B 10/6971; H04B 10/2537; H01S 3/302
See application file for complete search history.

(56) References Cited

U.S. PATENT DOCUMENTS

| 5,699,179 | A  | 12/1997 | Gopalakrishnan |
| 6,304,369 | B1 | 10/2001 | Piehler |
| 6,535,328 | B2 * | 3/2003 | Yao ................... H04B 10/2916 250/227.11 |
| 6,600,593 | B2 | 7/2003 | Pedersen |
| 7,394,331 | B2 | 7/2008 | Yeung et al. |

(Continued)

OTHER PUBLICATIONS

D. Marpaung et al., "Low-power, chip-based stimulated Brillouin scattering microwave photonic filter with ultrahigh selectivity" Optica 2, 76-83; 2015: pp. 16.

(Continued)

*Primary Examiner* — Eric L Bolda
(74) *Attorney, Agent, or Firm* — Allen, Dyer, Doppelt + Gilchrist, P.A. Attorneys at Law

(57) ABSTRACT

A radio frequency (RF) photonic equalizer may include a first electro-optic (E/O) modulator configured to modulate an optical carrier based upon an RF input signal, a stimulated Brillouin scattering (SBS) medium coupled to the first E/O modulator, and a second E/O modulator configured to modulate the optical carrier based upon an equalizing function waveform. An optical circulator may be coupled to the SBS medium and the second E/O modulator, and a photodetector may be coupled to the optical circulator.

21 Claims, 7 Drawing Sheets

(56) References Cited

U.S. PATENT DOCUMENTS

| | | |
|---|---|---|
| 7,623,797 B2 | 11/2009 | Crivelli et al. |
| 7,813,654 B1 | 10/2010 | Ng et al. |
| 7,877,020 B1 | 1/2011 | Hayes et al. |
| 8,538,270 B2 | 9/2013 | Seidel et al. |
| 9,755,754 B2 | 9/2017 | Schaefer et al. |
| 9,967,031 B1* | 5/2018 | Middleton ............ H04B 10/00 |
| 2001/0024317 A1* | 9/2001 | Yao ........................ H01S 3/302 |
| | | 359/334 |

OTHER PUBLICATIONS

Y. Stern et al. "Tunable sharp and highly selective microwave-photonic band-pass filters based on stimulated Brillouin scattering" Photon. Res. 2, B18-B25; 2014: pp. 7.

U.S. Appl. No. 15/479,608, filed Apr. 5, 2017.

Yi et al.; "Polarization-Independent Rectangular Microwave Photonic Filter Based on Stimulated Brillouin Scattering;" Journal of Lightwave Technology 34(2):1-1; ; DOI: 10.1109/JLT2015.2475297; Jan. 2016, pp. 669-675.

* cited by examiner

RF SYSTEM WITH STIMULATED BRILLOUIN SCATTERING (SBS) PHOTONIC EQUALIZER AND RELATED METHODS

TECHNICAL FIELD

This disclosure relates to radio frequency (RF) systems, and more particularly to RF systems for communications, sensing, and other related fields and related methods.

BACKGROUND

Radio frequency (RF) systems often exhibit frequency-dependent gain slope and ripple in their spectral responses. This non-uniform frequency response is inherent to all electronic components. However, other factors can exacerbate the frequency response. For example, these include impedance mismatch, frequency dependent RF components and environmental effects.

Ripple and gain slope ultimately causes errors in data transmission. As a result, a gain flatness metric is often specified for RF systems. By way of example, a gain flatness of +/−1 dB may be required for frequencies in the MHz range.

Accordingly, various equalization techniques are often implemented to flatten the frequency response. Typical analog electronic equalizers are static and generally provide an inverse gain slope to what the frequency response of the system is. However, some implementations use dynamic analog electronic equalizers, which are active systems designed to correct VSWR as well as gain slope.

One example equalizer is set forth in U.S. Pat. No. 7,394,331 to Yeung et al., which discloses a programmable passive equalizer. The equalizer is programmable to respond to one or more changes in a signal caused by the communication of the signal through various signal components. The passive equalizer includes a programmable resistor device and a programmable capacitor device arranged in parallel to one another, with the programmable resistor device and the programmable capacitor being arranged to provide an output to a node. An inductor device and a resistor device are arranged in series, with the inductor device and the resistor device also being configured to provide an output to the node.

Generally speaking, electronic equalizer approaches may suffer from various drawbacks. These may include added loss into the system, narrowband response, low resolution, and poor performance at high frequencies. As such, further enhancements may be desirable for RF signal equalization in various applications.

SUMMARY

A radio frequency (RF) photonic equalizer may include a first electro-optic (E/O) modulator configured to modulate an optical carrier based upon an RF input signal, a stimulated Brillouin scattering (SBS) medium coupled to the first E/O modulator, and a second E/O modulator configured to modulate the optical carrier based upon an equalizing function waveform. An optical circulator may be coupled to the SBS medium and the second E/O modulator, and a photodetector may be coupled to the optical circulator.

More particularly, the photodetector may generate an RF output signal based upon the equalization function waveform applied to the RF input signal. The RF photonic equalizer may further include a waveform generator coupled to the second E/O modulator and configured to generate the equalizing function waveform. In accordance with one example, the waveform generator may be configured to dynamically vary the equalizing function waveform. In still another example, the waveform generator may be configured to add an inverse of an RF system frequency response to the RF input signal.

In addition, the RF photonic equalizer may further include an optical isolator coupled between the first E/O modulator and the SBS medium. In an example embodiment, the photonic equalizer may also include an optical amplifier coupled between the second E/O modulator and the optical circulator. Furthermore, the RF photonic equalizer may also include a laser source configured to generate the optical carrier.

A related RF system is also provided which may include an RF receiver and an RF photonic equalizer, such as the one described briefly above. A related method for RF photonic equalization may include modulating an optical carrier based upon an RF input signal using a first EO) modulator, and passing the modulated optical carrier through an SBS medium coupled to the first E/O modulator. The method may further include modulating the optical carrier based upon an equalizing function waveform using a second E/O modulator, and generating an output RF signal using an optical circulator coupled to the SBS medium and the second E/O modulator, and a photodetector coupled to the optical circulator.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
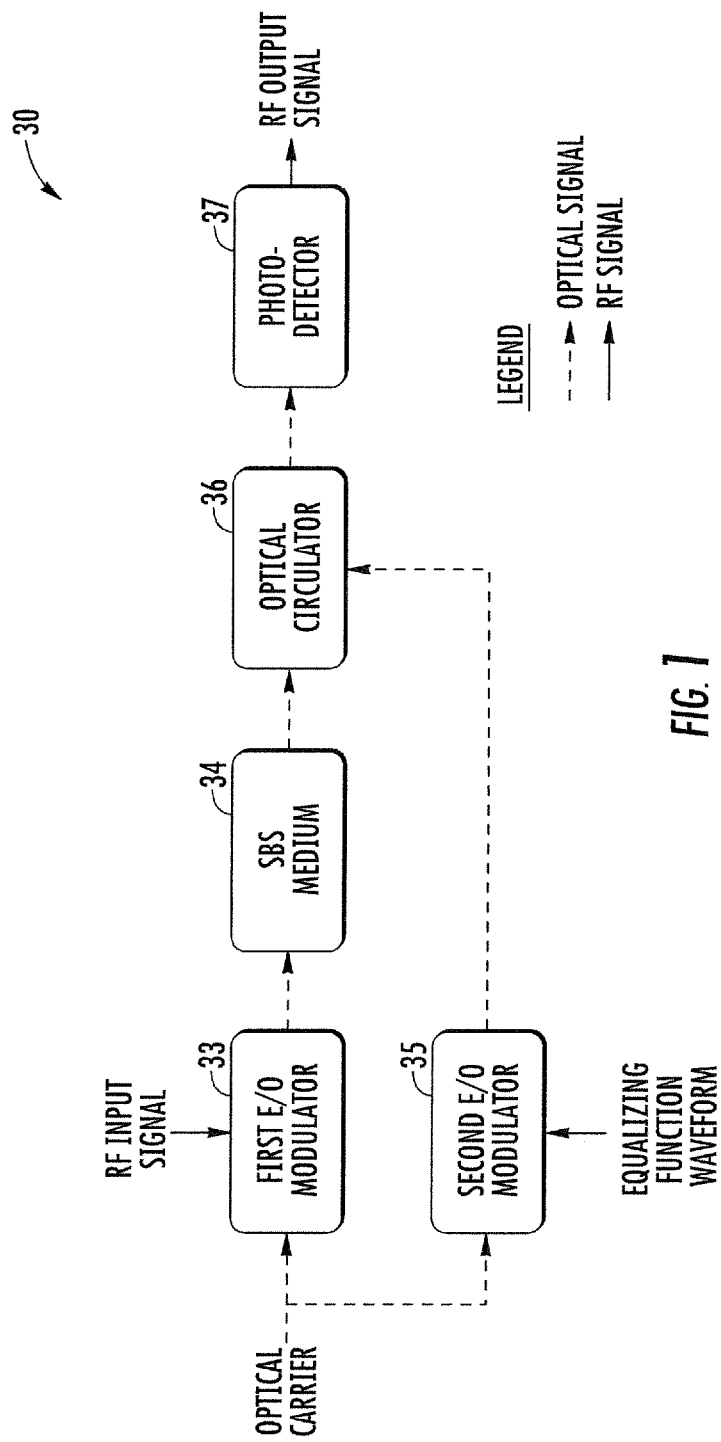
FIG. 1 is a schematic block diagram of a radio frequency (RF) photonic equalizer in accordance with an example embodiment.
Figure 2:
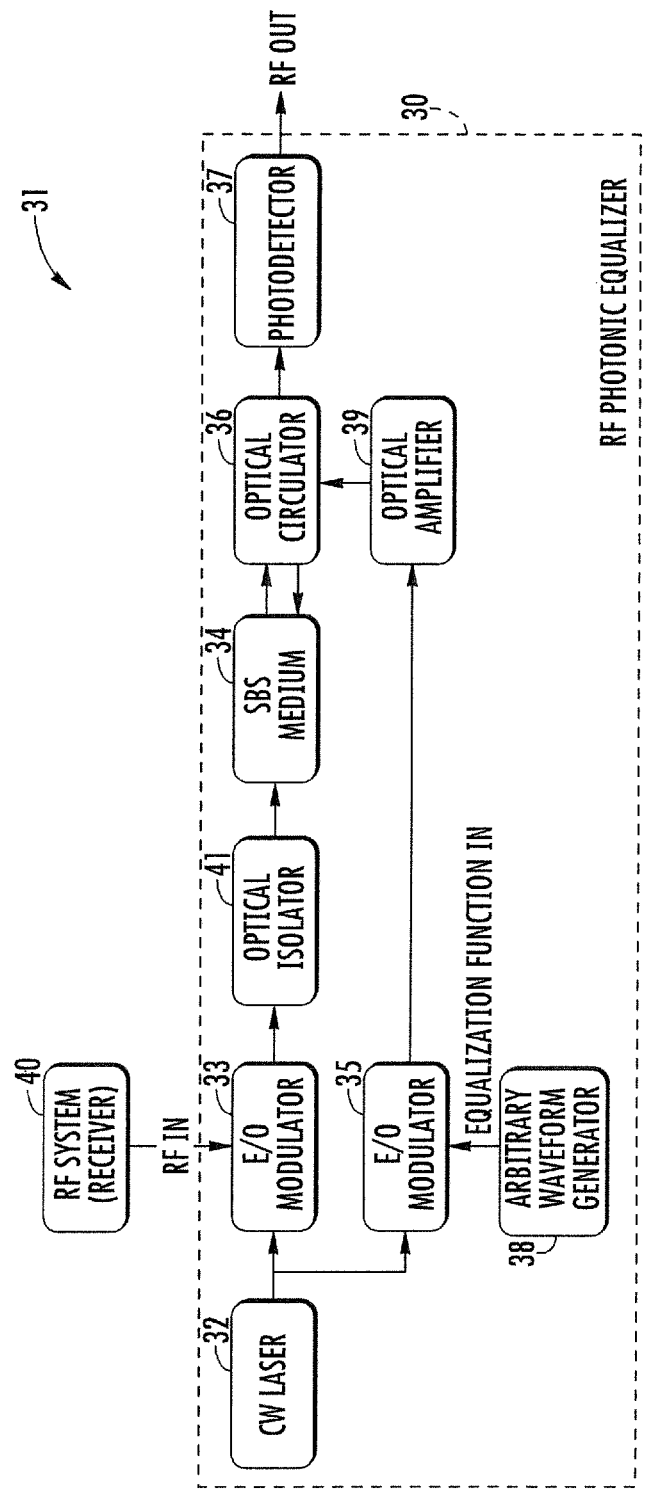
FIG. 2 is a more detailed schematic block diagram of an RF communications system including the RF photonic equalizer of FIG. 1.
Figure 3:
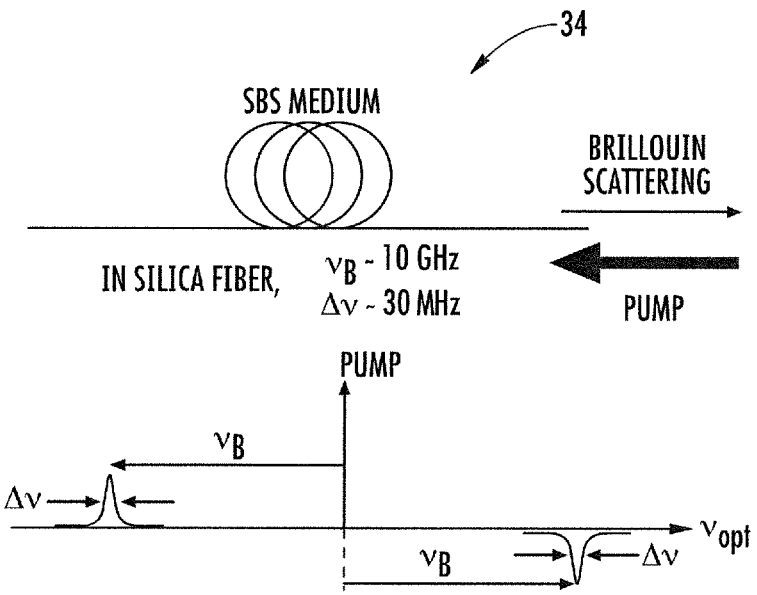
FIGS. 3-7 are a series of schematic diagrams and respective optical signal diagrams illustrating propagation of the input and pump signals through the SBS medium of the photonic equalizer of FIG. 1.
Figure 4:
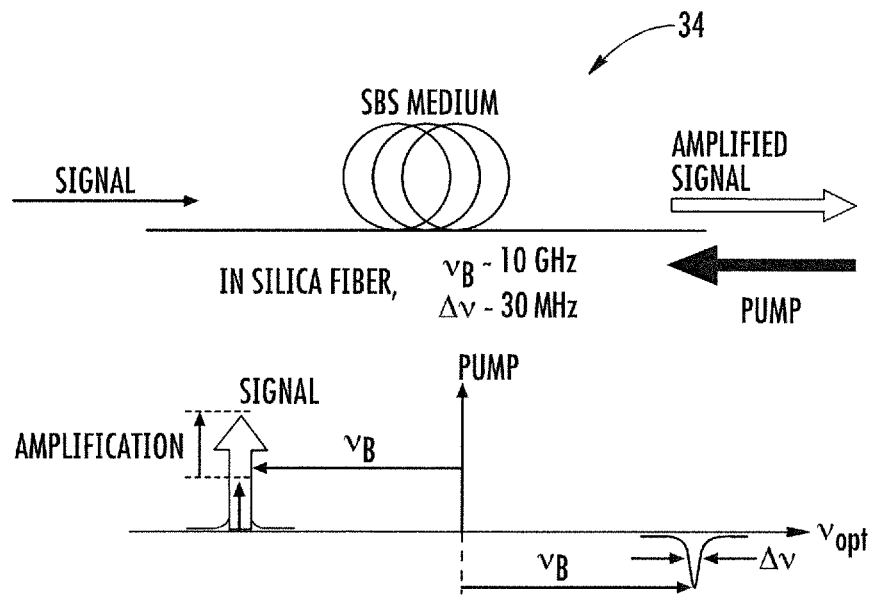
Figure 5:
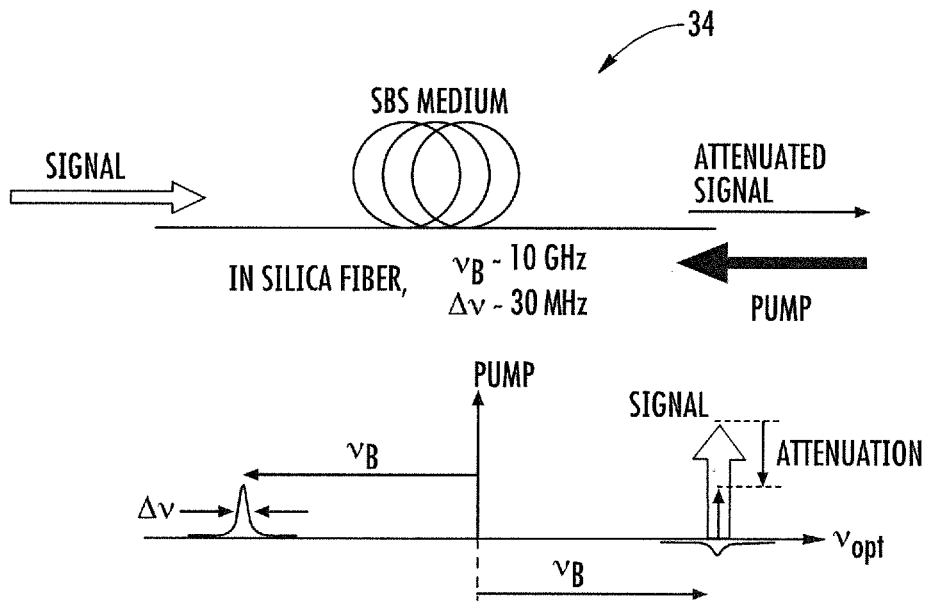
Figure 6:
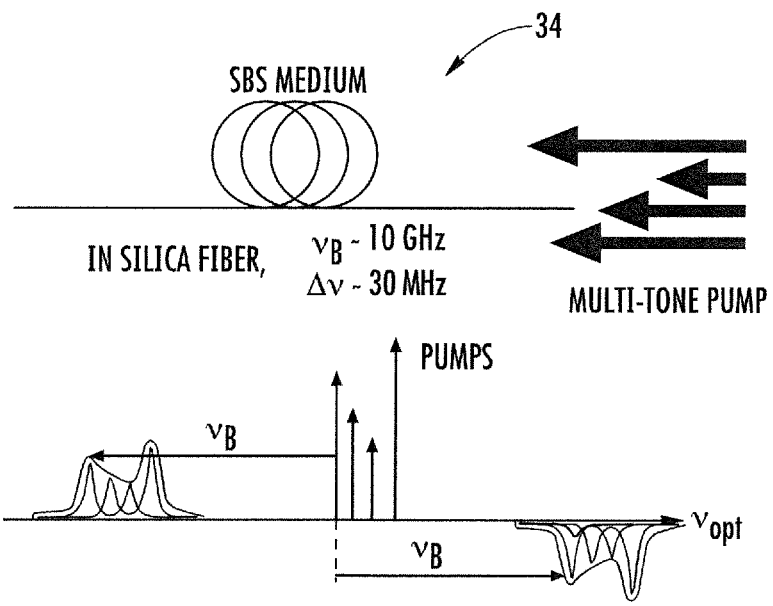
Figure 7:
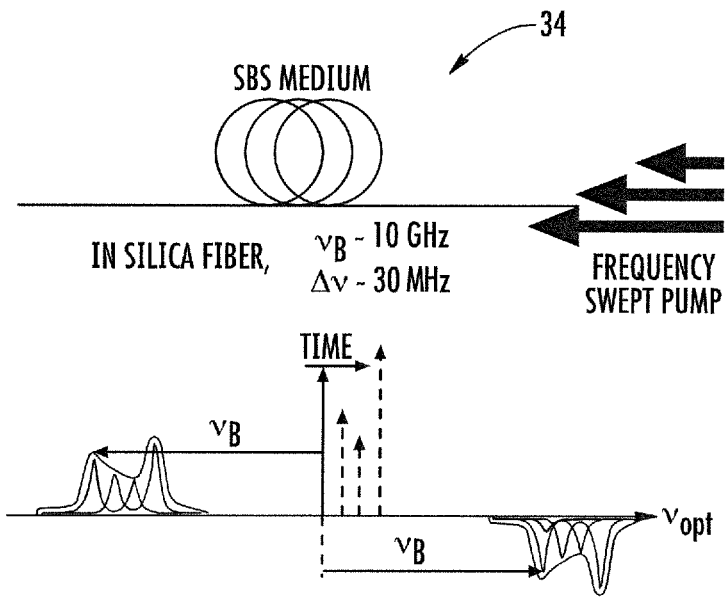

Referring initially to FIGS. 1 and 2, a radio frequency (RF) photonic equalizer 30 and associated RF communications system 31 incorporating the RF photonic equalizer are first described. The photonic equalizer 30 advantageously applies a photonic equalizing technique based on stimulated Brillouin scattering (SBS), a nonlinear optical effect that occurs above certain optical power levels in various media and provides frequency-specific gain or loss bands based on the optical frequency of an input pump signal. More particularly, the equalizer 30 illustratively includes an optical source, here a continuous-wave (CW) laser 32, which generates an optical carrier signal which may optionally be amplified by an optical amplifier (not shown), such as an erbium-doped fiber amplifier (EDFA). By way of example, the CW laser 32 may have a wavelength of 1550 nm, although other wavelengths may be used in different embodiments.

Light from the laser 32 may be divided along two paths by a power divider (not shown). The first path provides an input for a first electro-optic (E/O) modulator 33 configured to modulate the optical carrier based upon an RF input signal, such as from an RF system 40. In the illustrated example, the RF system 40 includes a receiver, but in some embodiments the RF system may also include a transmitter, for example. An SBS medium 34 is illustratively coupled to the first E/O modulator 33, and a second E/O modulator 35 is configured to modulate the optical carrier based upon an equalizing function waveform, as will be discussed further below. By way of example, one or more of the first and second E/O modulators 33, 35 may be Mach-Zehnder modulators. However, other types of E/O modulators may be used in different embodiments.

The equalizer 30 further illustratively includes an optical circulator 36 coupled to the SBS medium 34 and the second E/O modulator 35, and a photodetector 37 coupled to the optical circulator. In some embodiments, an optical isolator 41 may be coupled between the first E/O modulator 33 and the SBS medium 34. The photodetector 37 is configured to generate an RF output signal based upon the equalization function waveform applied to the RF input signal. In the example of FIG. 1, dashed arrows indicate optical signal flow and solid arrows represent RF signal flow.

More particularly, the RF photonic equalizer 30 may include a waveform generator 38 coupled to the second E/O modulator 35 and configured to generate the equalizing function waveform. In accordance with one example, the waveform generator 38 may be an arbitrary waveform generator (AWG) configured to dynamically vary the equalizing function waveform based upon an iterative algorithm, for example. The equalizing function waveform may be formed by combining one or more signals or tones at different frequencies to use as pump signals in the SBS medium 34. The waveform generator 38 may add an inverse of an RF system frequency response to the RF input signal as a pump signal via the optical circulator 36. The waveform generator 38 may be implemented with a field-programmable gate array (FPGA), application-specific integrated circuit (ASIC), etc.

The pump signal will provide a Brillouin-shifted gain bandwidth whose width is dependent on the SBS medium 34. By varying the pump signal(s), the width, frequency, and shape of the equalizing function waveform may accordingly be set by the waveform generator 38. Further details regarding SBS microwave photonic filtering may be found in D. Marpaung et al., "Low-power, chip-based stimulated Brillouin scattering microwave photonic filter with ultrahigh selectivity," Optica 2, 76-83 (2015), and Y. Stern et al., "Tunable sharp and highly selective microwave-photonic band-pass filters based on stimulated Brillouin scattering," Photon. Res. 2, B18-B25 (2014), which are hereby incorporated herein in their entireties by reference.

An optical amplifier 39 may also be included to boost the pump signal above an SBS threshold to create the desired SBS effect, as will be appreciated by those skilled in the art. As noted above, the optically modulated and amplified filter function signal is introduced to the RF signal path via the optical circulator 36, so that it propagates along the same path as the RF signal, but in the opposite direction. This is done to apply optical gain and loss to the spectral response using the SBS medium 34, as will now be discussed further with reference to FIGS. 3-7.

As the distorted RF signal is introduced to the SBS medium 34, so too is the counter-propagating pump signal to generate an attenuated or amplified signal at the input of the photodetector 37. A strong optical pump signal may scatter off an acoustic wave in the propagation medium generated by the pump itself. The acoustic wave acts as a moving grating, effectively leading to a Doppler shift of the scattered light. The scattered light is shifted by the Brillouin frequency (related to the acoustic velocity of the medium) and has a Lorentzian spectrum of bandwidth related to the acoustic wave lifetime of the medium. In silica based standard single mode fiber, the Brillouin frequency is typically ~10 GHz and bandwidth is ~30 MHz at full width half maximum. The aggregate bandwidth may be increased through a multiplicity of pumps or a single pump swept over frequency. Counter-propagating light resonant with the Stokes-shifted Brillouin spectrum may be amplified, while counter-propagating light resonant with the anti-Stokes spectrum may be attenuated. The amount of gain or loss depends on the SBS medium length and material characteristics, pump and probe powers, and relative polarization state of pump and probe.

Figure 8:
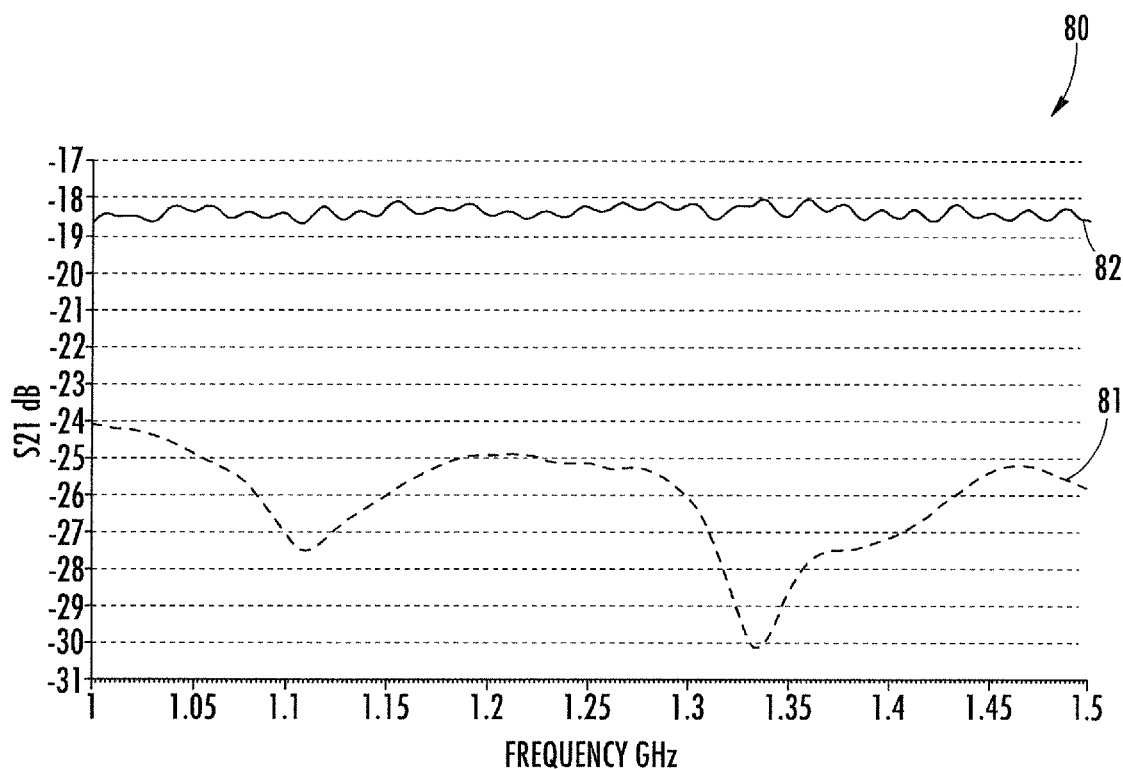
FIG. 8 is a graph including measured plots of RF spectrum output vs. frequency before and after equalization using the RF photonic equalizer of FIG. 1 in accordance with an example implementation.

An example RF signal equalization measurement using the above-described approach is demonstrated in the graph 80 of FIG. 8. In the illustrated example, the RF signal plot 81 corresponds to the original distorted RF signal with no SBS equalization applied. The attenuated RF signal plot 82 corresponds to the RF signal after equalization by the equalizer 30, which applies the above-described photonic equalization across the illustrated signal range. The resulting signal has a significantly flattened frequency response which advantageously provides a gain flatness within +/−1 dB.

Figure 9:
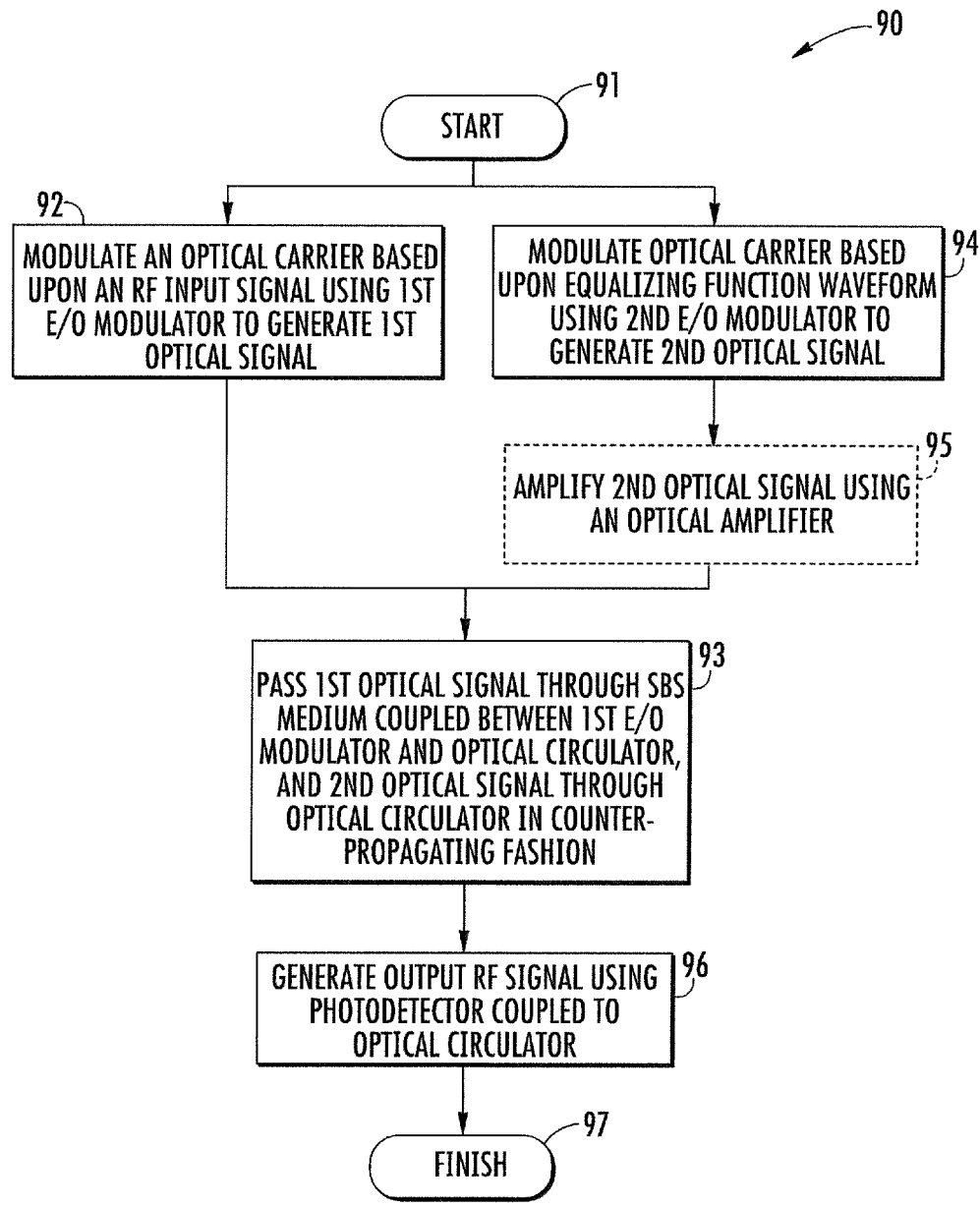
FIG. 9 is a flow diagram illustrated method aspects associated with the RF photonic equalizer of FIG. 1.

Operation of the equalizer 30 will be further understood with reference to the flow diagram 90 of FIG. 9, which begins at Block 91. The CW laser 32 generates the optical carrier, which is optically split and fed into the E/O modulators 33, 35. The signal path modulator 33 converts the distorted electrical signal from the RF system 40 into the optical domain (Block 92), manifesting as optical sidebands off of the carrier. This signal passes through the optical isolator 36 and into the SBS gain medium 34, at Block 93, where the interaction of the RF input signal and the pump occur. The pump path modulator 35 performs the same E/O conversion on the arbitrarily generated equalization function waveform (Block 94), which is programmed to compensate for the distortion. This is (optionally) then optically amplified by the amplifier 39 (Block 95) to stimulate Brillouin scattering in the SBS medium 34, as noted above. The circulator 36 serves to counter-propagate the pump signal into the SBS medium 34 while the RF signal is passing in the propagating direction. The resulting SBS from the pump may be positioned in frequency to add optical gain or optical loss to the signal in the propagating direction, thus equalizing the signal. The optical signal is converted into an electrical signal via the photodetector 37, at Block 96, which illustratively concludes the method of FIG. 9 (Block 97).

The equalizer 30 advantageously provides for an arbitrarily configurable photonic system which adds the inverse of an RF system frequency response to provide an equalized total system frequency response. Yet, the equalizer 30 is an all analog equalizer that advantageously has a relatively high resolution (e.g., <30 MHz), wide operating bandwidth (e.g., DC-110 GHz), and wide instantaneous bandwidth (IBW) (e.g., >15 GHz). Moreover, the equalizer 30 is arbitrarily and dynamically reconfigurable, has significant amplitude adjustability (e.g., >50 dB), and may advantageously provide dynamic spectral manipulation at sub-microsecond timescales.

Figure 10:
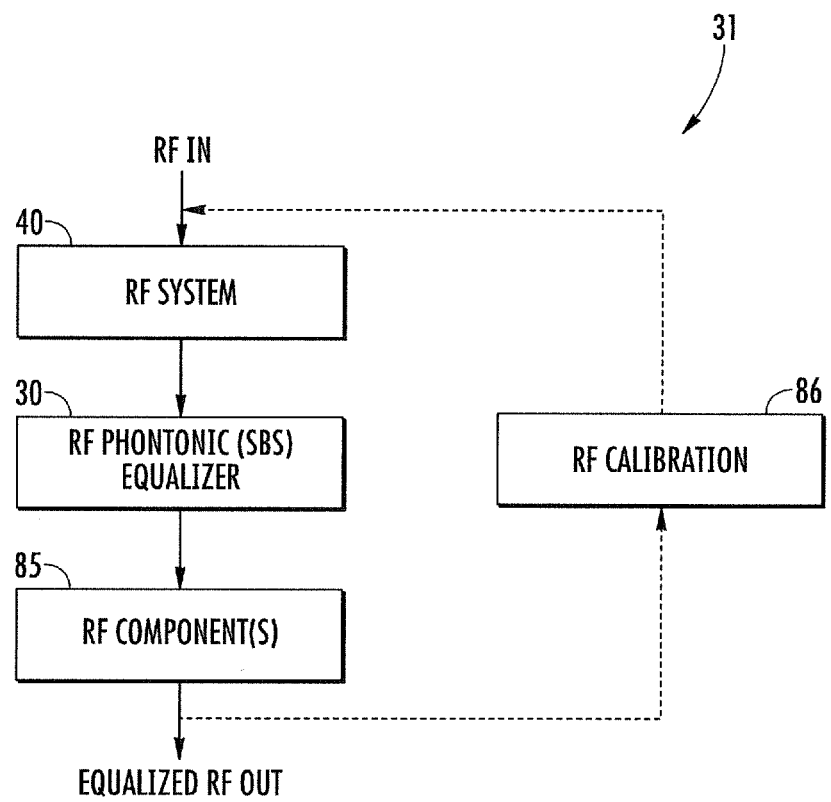
FIG. 10 is a schematic block diagram of another embodiment of the system of FIG. 2 in accordance with an example implementation.

Another example implementation of the system 31 is shown in FIG. 10. In this configuration, equalization is performed based upon the output of one or more RF components 85 downstream from the RF photonic equalizer 30. By way of example, such RF components 85 may include cables, filters, amplifiers, etc. An RF calibration system or device 86, such as a network analyzer, may be coupled between the input to the RF system 40 and the output of the RF component(s) 85 as shown. By way of example, this may be done as a calibration step or during the manufacturing process, and the RF calibration device 86 may be remove before the system 31 is put into service, although in some embodiments an RF calibration device may also be used in the field as well.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A radio frequency (RF) photonic equalizer comprising:
a first electro-optic (E/O) modulator configured to modulate an optical carrier based upon an RF input signal;
a stimulated Brillouin scattering (SBS) medium coupled to the first E/O modulator;
a second E/O modulator configured to modulate the optical carrier based upon an equalizing function waveform;
an optical circulator coupled to the SBS medium and the second E/O modulator; and
a photodetector coupled to the optical circulator.

2. The RF photonic equalizer of claim 1 wherein the photodetector is configured to generate an RF output signal based upon the equalization function waveform applied to the RF input signal.

3. The RF photonic equalizer of claim 1 further comprising a waveform generator coupled to the second E/O modulator and configured to generate the equalizing function waveform.

4. The RF photonic equalizer of claim 3 wherein the waveform generator is configured to dynamically vary the equalizing function waveform.

5. The RF photonic equalizer of claim 3 wherein the waveform generator is configured to add an inverse of an RF system frequency response to the RF input signal.

6. The RF photonic equalizer of claim 1 further comprising an optical isolator coupled between the first E/O modulator and the SBS medium.

7. The RF photonic equalizer of claim 1 further comprising an optical amplifier coupled between the second E/O modulator and the optical circulator.

8. The RF photonic equalizer of claim 1 further comprising a laser source configured to generate the optical carrier.

9. A radio frequency (RF) system comprising:
an RF receiver; and
an RF photonic equalizer comprising
a laser source configured to generate an optical carrier,
a first electro-optic (E/O) modulator coupled to the laser source and configured to modulate the optical carrier based upon an RF input signal from the RF receiver,
a stimulated Brillouin scattering (SBS) medium coupled to the first E/O modulator,
a waveform generator configured to generate a dynamically variable equalizing function waveform,
a second E/O modulator coupled to the laser source and the waveform generator and configured to modulate the optical carrier based upon the dynamically variable equalizing function waveform,
an optical circulator coupled to the SBS medium and the second E/O modulator, and
a photodetector coupled to the optical circulator.

10. The RF system of claim 9 wherein the waveform generator is configured to add an inverse of an RF system frequency response to the RF input signal.

11. The RF system of claim 9 wherein the RF photonic equalizer further comprises an optical isolator coupled between the first E/O modulator and the SBS medium.

12. The RF system of claim 9 wherein the RF photonic equalizer further comprises an optical amplifier coupled between the second E/O modulator and the optical circulator.

13. The RF system of claim 9 wherein the laser source comprises a continuous wave (CW) laser source.

14. A method for radio frequency (RF) photonic equalization comprising:
modulating an optical carrier based upon an RF input signal using a first electro-optic (E/O) modulator to generate a first optical signal;
passing the first optical signal through a stimulated Brillouin scattering (SBS) medium coupled to the first E/O modulator;
modulating the optical carrier based upon an equalizing function waveform using a second E/O modulator to generate a second optical signal;
generating an output RF signal using an optical circulator and a photodetector coupled to the optical circulator based upon the first and second optical signals.

15. The method of claim 14 wherein generating the output RF signal comprises injecting the first optical signal into the optical circulator, and injecting the second optical signal into the optical circulator in a counter-propagating direction with respect to the first optical signal.

16. The method of claim 14 wherein generating the output RF signal comprises generating the RF output signal based upon the equalization function waveform applied to the RF input signal.

17. The method of claim 14 further comprising generating the equalizing function waveform using a waveform generator coupled to the second E/O modulator.

18. The method of claim 17 further comprising dynamically varying the equalizing function waveform using the waveform generator.

19. The method of claim 17 further comprising adding an inverse of an RF system frequency response to the RF input signal using the waveform generator.

20. The method of claim 14 further comprising generating the optical carrier using a laser source.

21. The method of claim 20 wherein the laser source comprises a continuous wave (CW) laser source.

* * * * *